(12) United States Patent
McCreight et al.

(10) Patent No.: US 7,052,540 B2
(45) Date of Patent: May 30, 2006

(54) AQUEOUS DISPERSIONS OF CARBOXYLATED CELLULOSE ESTERS, AND METHODS OF MAKING THEM

(75) Inventors: Kevin Wayne McCreight, Kingsport, TN (US); Dean Charles Webster, Fargo, ND (US); Lisa Kay Kemp, Hattiesburg, MS (US)

(73) Assignee: Eastman Chemical Company, Kingsport, TN (US)

( * ) Notice: Subject to any disclaimer, the term of this patent is extended or adjusted under 35 U.S.C. 154(b) by 172 days.

(21) Appl. No.: 10/798,247

(22) Filed: Mar. 11, 2004

(65) Prior Publication Data

US 2005/0203278 A1    Sep. 15, 2005

(51) Int. Cl.
*C08L 1/32* (2006.01)
*C09D 101/32* (2006.01)

(52) U.S. Cl. .............................. 106/168.01; 106/170.1; 106/170.11; 106/170.14; 106/170.42; 106/170.43; 106/170.47; 106/170.49; 106/170.51; 106/171.1

(58) Field of Classification Search ........... 106/168.01, 106/170.1, 170.11, 170.14, 170.42, 170.43, 106/170.47, 170.49, 170.51, 171.1
See application file for complete search history.

(56) References Cited

U.S. PATENT DOCUMENTS

| | | | |
|---|---|---|---|
| 2,768,161 A | 10/1956 | Malm et al. | |
| 2,856,400 A | 10/1958 | Malm et al. | |
| 4,330,338 A | * 5/1982 | Banker ................. | 106/162.82 |
| 4,504,656 A | * 3/1985 | Omiya ........................ | 536/66 |
| 4,590,265 A | 5/1986 | Bogan et al. | |
| 5,319,019 A | 6/1994 | Nothnagel | |
| 5,356,988 A | 10/1994 | Nothnagel | |
| 5,380,771 A | 1/1995 | Nothnagel | |
| 5,384,163 A | 1/1995 | Budde et al. | |
| 5,668,273 A | 9/1997 | Allen et al. | |
| 5,792,856 A | 8/1998 | Allen et al. | |
| 5,973,139 A | 10/1999 | Lee et al. | |
| 5,981,738 A | 11/1999 | Cook et al. | |
| 5,994,530 A | 11/1999 | Posey-Dowty et al. | |
| 6,046,259 A | 4/2000 | Das et al. | |
| 6,225,402 B1 | 5/2001 | O'Callaghan et al. | |
| 6,277,953 B1 | 8/2001 | Nothnagel et al. | |
| 6,306,956 B1 | 10/2001 | Spilman et al. | |
| 2002/0028874 A1 | 3/2002 | Nothnagel et al. | |

FOREIGN PATENT DOCUMENTS

| | | |
|---|---|---|
| EP | 0 138 703 A2 | 4/1985 |
| WO | WO 00/18826 A1 | 4/2000 |
| WO | WO 02/10297 A2 | 2/2002 |
| WO | WO 02/36637 A1 | 5/2002 |

OTHER PUBLICATIONS

"CMCAB 641-0.2 and 641-0.5 Cellulose Esters" Publication GN-431A, Eastman, Feb. 2003.*
I. D. Sand, "The Properties and Applications of Ozonolyzed Cellulose Acetate Butyrate," Polymer Material Science Engineering, (1987) pp. 57-63.
Notification of Transmittal of the International Search Report and the Written Opinion of the International Searching Authority, or the Declaration date of mailing Aug. 25, 2005.

* cited by examiner

*Primary Examiner*—David Brunsman
(74) *Attorney, Agent, or Firm*—Bernard J. Graves, Jr.; Polly C. Owen

(57) ABSTRACT

Aqueous dispersions of carboxylated cellulose esters are disclosed having a low organic solvent content. These dispersions can be prepared using a volatile hydrophilic organic solvent and a coupling organic solvent having a lower volatility, the volatile hydrophilic solvent being substantially stripped off during preparation to obtain a dispersion useful in a variety of coating compositions, providing satisfactory performance in metallic flake control, flow and leveling properties, and defect reduction.

69 Claims, No Drawings

AQUEOUS DISPERSIONS OF CARBOXYLATED CELLULOSE ESTERS, AND METHODS OF MAKING THEM

BACKGROUND OF THE INVENTION

Cellulose esters are valuable polymers which are useful in many plastic, film, coating, and fiber applications. In coatings applications, cellulose esters are typically applied from organic solvent solutions, although those having sufficient carboxyl content may be dispersed in water, with the aid of organic solvents, and applied as an aqueous dispersion or solution.

A variety of carboxylated cellulose esters are known, and may be used in coating compositions. For example, carboxyalkyl cellulose esters, such as such as those described in U.S. Pat. Nos. 5,668,273, 5,792,856, and 5,994,530, the disclosures of which are incorporated herein by reference in their entirety, are soluble in a variety of organic solvents. As described in Eastman Chemical Company Publication No. GN-431A (February 2003) entitled "*CMCAB* 641-0.2 and 641-0.5 Cellulose Esters," these esters can be dispersed into water by preparing an organic solvent solution of the carboxyalkyl cellulose ester, and adding to the solution either ammonia or an amine, and water. The water can be added separately from the ammonia or amine, or can be premixed with the ammonia or amine. The resulting dispersions typically have a solids content from about 5 to about 25%, and the ratio of cellulose ester to solvent ranges from about 1:4 to about 1:1. Because this method requires at least a 1:1 ratio of ester to organic solvent, the resulting dispersions have a relatively high volatile organic compound (VOC) content. Environmental regulations limit the amount of VOC content in certain coating formulations, and further such restrictions are expected. There remains a need in the art to provide aqueous carboxylated cellulose ester dispersions having a lower VOC content.

U.S. Pat. Nos. 5,668,273 and 5,792,856 describe certain carboxyalkyl cellulose esters of higher acids, and especially carboxymethyl cellulose esters of higher acids, such as carboxymethyl cellulose acetate propionate, carboxymethyl cellulose propionate, carboxymethyl cellulose acetate butyrate, and carboxymethyl cellulose butyrate. The ether derivatives of the cellulose esters described exhibit solubility in a wide range of organic solvents, compatibility with a variety of resins, and ease of dispersion in a waterborne formulation. The aqueous dispersions described in these patents are prepared by dissolving the esters in organic solvents, partially neutralizing the esters, and dispersing them in water. While the resulting aqueous dispersions are suitable for use in a wide variety of coating formulations, their high VOC content makes them unsuitable for applications requiring a low VOC content.

These patents also describe zero VOC dispersions in aqueous ammonia that are quite water tolerant. The dispersions described are, in effect, ester solutions, since the ester is essentially solubilized in the ammonia. Because of the water tolerance of these ester solutions, they may be water-diluted to form what are, in effect, fully neutralized aqueous solutions. However, because of the quantity of ammonia required to solubilize the esters, the pH of these solutions is typically very high, which can compromise the hydrolytic stability of the cellulose esters.

Similarly, U.S. Pat. No. 5,994,530 describes carboxyalkyl cellulose esters of higher acids, and their use in aqueous dispersions useful in formulating waterborne coating compositions containing pigments, especially metallic pigments such as aluminum flakes and mica. These aqueous pigment dispersions may be prepared by adding an organic solvent solution of the ester to a metallic dispersion, partially or fully neutralizing the ester (from about 25 to about 100% of the pendant carboxyl groups) by adding an organic or inorganic base, and then mixing in water. In alternative methods, the base may be added with water prior to the addition of organic solvent, or added to an organic solution of the ester, either undiluted or diluted with an organic solvent. The resulting mixture may then be added directly to an aluminum flake dispersion containing only aluminum flake and an organic solvent. In further alternative methods, the ester may be added directly to aluminum flake which contains a solvent that will dissolve the ester, or the ester may be first swelled with a suitable aqueous base, followed by addition of a suitable organic solvent. While these methods provide aqueous ester dispersions that provide excellent metallic flake orientation properties, the VOC content may be higher than applicable environmental regulations allow.

U.S. Pat. No. 5,319,019 describes aqueous dispersions of an ammonia salt of an acrylic polymer having a low VOC content. A method is disclosed in which an amine salt of a high molecular weight acrylic polymer is prepared in a water-immiscible solvent. Water is then added to this solution to invert the mixture to form a salt/solvent azeotrope, and the azeotrope is then heated to remove the organic solvent, providing an aqueous dispersion of the polymer having less than 2 weight % organic solvent content.

In another process disclosed in the '019 patent, water is added to an organic solvent dispersion (consisting of ethylene glycol monobutyl ether alone, or a mixture of the ether with an organic solvent that is substantially immiscible in water) of the acrylic polymer, or the ammonia salt of the acrylic polymer, to form a mixture containing the ammonium salt of the acrylic polymer, organic solvent, and water. This mixture is inverted by the addition of water to form an organic-solvent-in-water azeotrope, having a boiling point from 95° to about 99° C. This azeotrope is heated to remove the organic solvent, and the water and solvent are condensed as they are removed from the dispersion. Xylene is added to the condensed water and solvent to effect a separation of the water and solvent, and the condensed water is circulated back into the mixture, to provide an aqueous dispersion of the ammonia salt of the acrylic polymer having less than 2 weight percent organic solvent. The patent also mentions that amines may be used in place of ammonia.

U.S. Pat. No. 5,356,988 describes aqueous dispersions and processes for making them, in which the salt of an acrylic polymer is prepared that is the reaction product of an acrylic polymer, an organic solvent which is either an organic solvent which is substantially water-immiscible or ethylene glycol monobutyl ether (which is water miscible at 25° C.), and a salification agent which is an amine or ammonia. According to the process described in the '988 patent, the aqueous dispersion is formed by adding the salt mixture to water at a rate of not more than about one-fourth of the salt/organic solvent dispersion per hour, the rate of addition being a function of the rate of the removal of the organic solvent through the heating or distillation of the azeotrope. The patent advises that at all times during the addition, no more than 15 weight percent of the organic solvent, based upon the total weight of organic solvent used to disperse the acrylic polymer, should be in the heated water/organic solvent mixture, in order to prevent the viscosity from increasing to unacceptably high levels. The higher the ratio of solvent to acrylic polymer or salt thereof, the more solvent which has to be azeotroped to be removed and discarded, and the lower the ratio of solvent to acrylic the greater the difficulty of dispensing the polymer in water will be. In an alternative embodiment, the polymer may be dispersed in the organic solvent and added as described above to water which includes amine or ammonia in an amount effective to neutralize the polymer.

Similarly, U.S. Pat. No. 5,380,771 describes a process in which a dispersion of substantially water-immiscible organic solvent and a water dispersible amine salt of a high molecular weight acrylic polymer are mixed with water, the mixture is inverted, and the organic solvent removed by heating or distilling the inverted mixture of the water dispersible acrylic amine salt, an azeotrope being formed from the water and the substantially water immiscible organic solvent. The azeotrope is said to have a boiling point of not more than 95° C., and the substantially water immiscible organic solvent a boiling point of at least above about 100° C. The amount of water in the amine salt/organic solvent/water mixture during the heating or distilling of the azeotrope should be maintained in an amount effective to provide a solids level in the final aqueous dispersion that is desired.

U.S. Pat. No. 6,046,259 describes in a comparative example the preparation of a cellulose acetate butyrate aqueous dispersion in which the cellulose ester is dissolved in methyl isobutyl ketone, and surfactant and water then added, followed by agitation at room temperature for 15 minutes. The mixture is then passed through an emulsifier to produce a microdispersion, which is then heated for azeotropic distillation of the ketone solvent.

U.S. Pat. No. 6,225,402 discloses neutralizing in an organic solvent an acrylic-modified chlorinated polyolefin polymer having ionizable groups; blending the solution of neutralized polymer with water to form a blend of neutralized polymer, organic solvent, and water; and removing the organic solvent from the blend at a temperature and pressure effective for forming a dispersion of the acrylic-modified chlorinated polyolefin polymer.

U.S. Pat. No. 6,277,953 describes stable aqueous polymer dispersions and processes for their preparation. According to the '953 patent, an ionic functional polymer is synthesized in a hydrophilic organic solvent, or synthesized neat and subsequently mixed with organic hydrophilic solvent. An amount of neutralizer is then added that is effective for providing a dispersion of the polymer upon addition of water and removal of solvent. After the formation of the polymer salt solution in the hydrophilic organic solvent, and mixing that solution with water to form a water/organic solvent/polymer salt blend, the organic solvent and water are removed or stripped from the blend at a duration, temperature, and pressure effective for providing an aqueous dispersion having a resin mean particle size of not greater than about 300 nm, a polymer concentration of at least about 30 weight percent and an organic solvent concentration of less than 2 weight percent.

U.S. Pat. No. 6,306,956 describes an aqueous dispersion of a polyester salt. According to the '956 patent, an ionic functional polyester polymer is synthesized neat and subsequently mixed with a hydrophilic organic solvent. The polyester has sufficient ionizable groups to provide the polyester with an acid value of from about 30 to about 50 and a solubility in the hydrophilic solvent of at least about 50 weight percent; and the organic hydrophilic solvent has a solubility in water of at least about 5 weight percent. At least about 30 percent of the ionizable groups of the polyester polymer in the solvent are neutralized with an amount of neutralizer effective to form a solution of neutralized polymer salt. The solution is thereafter mixed with water to form a blend of water/organic solvent/neutralized polymer. The organic solvent is then stripped from this blend at a temperature no greater than 65° C. to form a dispersion of neutralized polymer salt in water.

U.S. Pat. Appln. Publn. No. 2002/0028874 A1 discloses stable aqueous polymer dispersions and a process for their preparation. According to this publication, an ionic functional polymer is synthesized in a hydrophilic organic solvent, or synthesized neat and subsequently mixed with organic hydrophilic solvent. After the polymer is fully dissolved, an amount of neutralizer is added effective for providing a dispersion of the polymer upon addition of water and removal of solvent. After formation of the polymer salt solution in the hydrophilic organic solvent, and mixing that solution with water to form a water/organic solvent/polymer salt blend, the organic solvent and water are removed or stripped from the blend at a duration, temperature and pressure effective for providing an aqueous dispersion having a resin mean particle size of not greater than about 400 nm, a polymer concentration of at least about 30 weight percent and an organic solvent concentration of less than 5 weight percent.

Similarly, WO 00/18826 and WO 02/10297 disclose stable aqueous polymer dispersions made by processes similar to those already described.

There remains a need in the art for a method of dispersing carboxylated cellulose esters in water that results in an aqueous dispersion that is suitable for use in a variety of waterborne coating compositions, while having a relatively low VOC content.

BRIEF SUMMARY OF THE INVENTION

In one aspect, the invention relates to a process for producing an aqueous dispersion of a carboxylated cellulose ester. The process includes a first step of preparing a liquid mixture comprising: a carboxylated cellulose ester; a volatile hydrophilic organic solvent, having a relative evaporation rate, relative to n-butyl acetate, of at least about 1.0, and a solubility in water of at least about 5 weight percent; a coupling solvent, having a relative evaporation rate of less than about 0.5, and a solubility in water of at least about 3 weight percent; a neutralizer, present in an amount sufficient to neutralize at least a portion of the carboxyl groups present on the carboxylated cellulose ester; and water. In a subsequent step, either heat, or vacuum, or both, are applied to the liquid mixture in an amount sufficient to volatilize the volatile hydrophilic organic solvent, to thereby obtain the aqueous dispersion of the carboxylated cellulose ester. The invention relates also to the aqueous dispersions themselves, to coating compositions containing the aqueous dispersions, and to articles coated with the coating compositions.

DETAILED DESCRIPTION OF THE INVENTION

The present invention may be understood more readily by reference to the following detailed description of the invention, and to the Examples included therein.

Before the present compositions of matter and methods are disclosed and described, it is to be understood that this invention is not limited to specific synthetic methods or to particular formulations, unless otherwise indicated, and, as such, may vary from the disclosure. It is also to be understood that the terminology used is for the purpose of describing particular embodiments only, and is not intended to limit the scope of the invention.

The singular forms "a," "an," and "the" include plural referents, unless the context clearly dictates otherwise.

Optional or optionally means that the subsequently described event or circumstances may or may not occur. The description includes instances where the event or circumstance occurs, and instances where it does not occur.

Ranges may be expressed herein as from about one particular value, and/or to about another particular value. When such a range is expressed, it is to be understood that another embodiment is from the one particular value and/or to the other particular value.

Throughout this application, where patents or publications are referenced, the disclosures of these references in their entireties are intended to be incorporated by reference into this application, in order to more fully describe the state of the art to which the invention pertains.

The present invention provides stable aqueous dispersions of carboxylated cellulose esters with minimal VOC content, and without the need to use surfactants, though surfactants may optionally be present. The aqueous dispersions according to the invention allow a ratio of solvent to ester as low as 0.25 to 1 or less, allowing a reduction in solvent content of the aqueous dispersions of at least 75% compared to conventional dispersion technologies, which corresponds to an equivalent reduction in VOCs when non-exempt organic solvents are used.

In one aspect, the carboxylated cellulose esters are carboxyalkyl cellulose esters, that are ether-ester derivatives of cellulose which combine a carboxyalkyl ether (such as carboxymethyl) substituent and lower alkyl (such as $C_2$–$C_4$) ester substituents, for example propionyl, acetyl/propionyl, butyryl, or acetyl/butyryl ester substituents, having acid numbers between about 20 and about 120. Other carboxylated cellulose esters useful according to the invention include oxidized cellulose esters and other carboxyl-functionalized cellulose esters, as further described below.

The water content of the aqueous dispersions of the invention is typically at least 50% by weight, or at least 60% by weight, or from about 50% to about 95% by weight, or from about 60% to about 85% by weight.

The processes according to the invention achieve aqueous dispersions that typically contain 10% or less, or 6% or less, or 5% or less, or from about 1% to about 10%, by weight organic solvent content, from about 5% to about 40%, or from about 10% to about 30% by weight solids content, and mean particle sizes that are typically less than about 400 nm, or from about 50 nm to about 500 nm. These dispersions are useful due to their compatibility with a wide range of coatings resins and their unusual rheological properties that make them useful for metallic flake control, flow and leveling, and defect reduction in waterborne systems. These dispersions are particularly useful in waterborne wood coatings, waterborne automotive coatings, teletronic applications, and waterborne architectural and industrial maintenance coatings.

Preparation of an Aqueous Dispersion

Aqueous dispersions according to the invention may be prepared by providing a solvent solution of a carboxylated cellulose ester in a blend of a volatile hydrophilic organic solvent and a less volatile coupling solvent. This solvent solution may be prepared by adding the ester to either of the two solvents alone, and then adding the remaining solvent, or the ester may be added to the blend itself. Both the hydrophilic organic solvent and the coupling solvent will typically dissolve the ester at concentrations of at least 10% by weight, or at least 25% by weight or at least 40% by weight, or from about 5% to about 75% by weight. When the cellulose ester is dissolved in the blend of the hydrophilic organic solvent and the coupling solvent, such as through the application of a suitable means of agitation, a neutralizer (for example a base, such as an amine or ammonia) may be added to the solution to obtain a salt solution of the carboxylated cellulose esters.

The extent of the neutralization may vary depending on the acid number of the carboxylated cellulose ester used. As is known in the art, the amount of neutralizer required to obtain a desired percent neutralization may be determined given the amount of ester, the acid number of the ester, the formula weight of the neutralizer, and the percent neutralization desired, which is typically from about 5 to about 50%. For a typical carboxymethyl cellulose acetate butyrate with an acid number in the range of about 30 to about 100, or from about 50 to about 75, the level of neutralization may range from about 5% to about 50%, or from about 10% to about 30%, based on the number of available carboxyl moieties.

Although in some cases it might be possible to substantially solubilize the carboxylated cellulose ester, given the presence of sufficient ammonia, for example, the high levels of ammonia needed would lead to very high pH conditions, which could compromise the hydrolytic stability of the ester. The pH of the dispersions of the invention is therefore typically no more than about 7, or no more than about 6, or from about 3 to about 7.

Once the solution of the cellulose ester salt is formed in the mixture of hydrophilic organic solvent and coupling solvent, water may be added to the system in order to yield an aqueous dispersion containing the organic solvents, the neutralizer, and the cellulose ester. Subsequently, the hydrophilic organic solvent may be removed from the system, for example by a solvent stripping process. This process may be carried out under reduced pressure, and it is preferred that the temperature not be allowed to rise to a level at which the neutralizer, the water, or the coupling solvent is volatilized. That is, it is preferred that only the hydrophilic organic solvent be stripped off, and that the neutralizer, the water, and the coupling solvent substantially remain.

In an alternative method, the water and neutralizer may be combined prior to their addition to the solution of the cellulose ester in the blend of hydrophilic organic solvent and coupling solvent. In further alternative methods, the neutralizer may be blended in with the hydrophilic organic solvent, the less volatile coupling solvent, or the blend of the two, prior to the addition of the carboxylated cellulose ester. In a further alternative, the ester itself may be swelled with the neutralizer in water, that is, mixed with the neutralizer and water, prior to mixing with the solvent blend.

As further described below, these methods may be used to prepare stable, surfactant-free aqueous dispersions with significantly reduced organic solvent content, although surfactant may optionally be present.

In one aspect, additional neutralizer may subsequently be added to the aqueous dispersions in order to prepare aqueous solutions of the carboxylated cellulose ester, that is, preparations in which the ester is substantially dissolved, rather than simply being dispersed.

The water used in the processes according to the invention may be distilled water, deionized water, or the like.

Thus, the invention relates to processes in which stable, surfactant-free aqueous dispersions of high molecular weight carboxyalkyl cellulose esters can be prepared that contain 10% or less, or 6% or less, or 5% or less, or from about 1% to about 10%, organic solvent. This process is applicable, for example, to carboxyalkyl ($C_1$–$C_3$ alkyl) cellulose esters having an inherent viscosity of 0.20 to 1.7 dL/g as measured in a 60/40 (wt./wt.) solution of phenol/tetrachloroethane at 25° C., a degree of substitution per anhydroglucose unit of carboxy ($C_1$–$C_3$ alkyl) of about 0.20 to 0.75, and a degree of substitution per anhydroglucose unit of $C_2$–$C_4$ esters of about 1.5 to about 2.7.

In one such embodiment, a carboxymethyl cellulose butyrate is used having a degree of substitution per anhydroglucose unit of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of butyryl of about 1.50 to 2.70, and having an inherent viscosity of 0.20 to 0.70 dL/g, as measured in a 60/40 (wt./wt.) solution of phenol/tetrachloroethane at 25° C., or from about 0.35 to 0.60 dL/g.

As a further embodiment, there is used a carboxymethyl cellulose propionate having a degree of substitution per anhydroglucose unit of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of propionyl of about 1.50 to 2.70, and having an inherent viscosity of 0.20 to 0.70 dL/g, as measured in a 60/40 (wt./wt.) solution of phenol/tetrachloroethane at 25° C., or from about 0.35 to 0.60 dL/g.

As another preferred embodiment, there is used a carboxymethyl cellulose acetate butyrate having a degree of substitution of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65, and having an inherent viscosity of 0.20 to 0.70 dL/g, as measured in a 60/40 (wt./wt.) solution of phenol/tetrachloroethane at 25° C. It is preferred that the inherent viscosity be 0.35 to 0.60 dL/g. It is preferred that the degree of substitution per anhydroglucose unit of hydroxyl is 0.10 to 0.70, butyryl is 1.10 to 2.55, and acetyl is 0.10 to 0.90.

As a further embodiment, there is used a carboxymethyl cellulose acetate propionate having a degree of substitution per anhydroglucose unit of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of propionyl of about 0.10 to 2.60 and a degree of substitution per anhydroglucose unit of acetyl of about 0.10 to 2.65, and having an inherent viscosity of 0.20 to 0.70 dL/g, as measured in a 60/40 (wt./wt.) solution of phenol/tetrachloroethane at 25° C. The inherent viscosity may be from 0.35 to 0.60 dL/g. The degree of substitution per anhydroglucose unit of hydroxyl may be from 0.10 to 0.70, butyryl from 1.10 to 2.55, and acetyl from 0.10 to 0.90.

These and other carboxylated cellulose esters can be advantageously employed according to the invention, as further described below.

In the process according to the invention, the carboxylated cellulose ester may be dissolved in an organic solvent system, and specifically, a solvent blend that includes a volatile hydrophilic organic solvent and a less volatile coupling solvent. The volatile hydrophilic organic solvent will typically dissolve the ester at concentrations of at least 10 percent by weight, or at least 25 percent by weight, or at least 40 percent by weight, or from about 5% to about 75% by weight. In addition, the volatile hydrophilic organic solvents typically have evaporation rates (relative to n-butyl acetate, as used throughout the specification) of at least 1.0, or at least 2.0, or from about 1.0 to about 15, or from about 2.0 to about 10. The volatile hydrophilic organic solvent typically has a solubility of at least about 5 weight percent, or at least about 10 weight percent, in water, or from about 5% to about 100%. Water solubility may be defined as the amount of solvent in a solvent-water mixture that partitions to the aqueous phase (and, as such, can range from 0 to 100%). Ketone solvents are suitable for use as the volatile hydrophilic organic solvent, with methyl ethyl ketone and acetone being especially suitable.

Coupling solvents are those organic solvents having sufficient solubility in both the aqueous and organic phases to promote the solubility of a neutralized resin in water. The coupling solvent should have a sufficiently low evaporation rate relative to the volatile hydrophilic organic solvent such that the volatile hydrophilic organic solvent may be stripped out preferentially during the final stage of the dispersion preparation. The coupling solvent typically has an evaporation rate (relative to n-butyl acetate) of less than about 0.5, or less than about 0.2, or from about 0.001 to about 0.5, or from about 0.01 to about 0.2. Efficient coupling solvents should also have some measure of water solubility, such as greater than about 3%, or greater than about 5%, or from about 3% to about 100%. Further, the coupling solvent should have sufficient solvency for the ester at the requisite concentrations. For example, the coupling solvent will typically dissolve the ester at concentrations of at least 10 percent by weight, or at least 25 percent by weight, or at least 40 percent by weight, or from about 5% to about 75% by weight.

Glycol ethers are suitable coupling solvents. Glycol ethers comprise a category that includes, but is not limited to, ethylene glycol propyl ether, ethylene glycol butyl ether, 3-methoxybutanol, propylene glycol propyl ether, propylene glycol butyl ether, diethylene glycol ethyl ether, diethylene glycol propyl ether, diethylene glycol butyl ether, dipropylene glycol propyl ether, and dipropylene glycol butyl ether. For this application, preferred coupling solvents include ethylene glycol monobutyl ether, 3-methoxy-butanol, propylene glycol monopropyl ether, propylene glycol monobutyl ether, diethylene glycol monopropyl ether, diethylene glycol monobutyl ether, dipropylene glycol monopropyl ether, and dipropylene glycol monobutyl ether.

The organic solvent solutions of the carboxylated cellulose ester are typically prepared such that they include, prior to the hydrophilic organic solvent being removed, from about 1 part to about 5 parts volatile hydrophilic organic solvent per part of ester, or from about 2 parts to about 4 parts of volatile hydrophilic organic solvent per part of ester.

The coupling solvent is typically incorporated into the solution at less than 0.5 parts per part of ester, or less than about 0.3 parts per part of ester, or from about 0.1 part per part of ester to about 0.5 parts per part of ester, or from about 0.15 parts per part of ester to about 0.35 parts per part of ester.

A neutralizer, such as ammonia or an amine, may be added to the organic solvent solution of the ester in an amount sufficient to disperse the ester in water. Suitable neutralizers include, but are not limited to, dimethylethanolamine, triethanolamine, 2-amino-2-methyl-1-propanol, ammonia, piperidine, 4-ethylmorpholine, diethanolamine, ethanolamine, tributylamine, dibutylamine, potassium hydroxide, and sodium hydroxide. The amount of neutralizer used to prepare a dispersion of an ester depends on the choice of solvent, and the molecular weight, composition, and acid number of the ester. For a typical ester, such as a carboxymethyl cellulose acetate butyrate with an acid number in the range of 50 to 75, the level of neutralization may range from about 5% to about 50%, or from about 10% to about 30%, based on the number of available carboxyl moieties.

In an alternative process, the neutralizer may be blended in with either the hydrophilic organic solvent, the less volatile coupling solvent, or the solvent blend prior to the addition of the carboxylated cellulose ester. In a further alternative, the neutralizer may be added to the cellulose ester, prior to the incorporation of the hydrophilic organic solvent and the less volatile coupling solvent. In a further alternative, the ester itself may be swelled with the neutralizer and water, that is, mixed with the neutralizer and water, prior to preparation of the solvent solution.

Water may then be added to the neutralized organic solution of ester. The ratio of water to the volatile hydrophilic organic solvent may range from about 1:0.25 to about 1:5, or from about 1:0.5 to about 1:3. The water may be added to the neutralized organic solution under moderate agitation, for example at temperatures ranging from about 20° C. to about 60° C., or from about 20° C. to about 50° C.

In an alternative process, the neutralizer may be pre-mixed with the water and added slowly to the organic solvent solution of the ester in order to form a dispersion directly, without initially preparing a neutralized organic solvent solution.

The volatile hydrophilic organic solvent may then be removed, while ensuring that the neutralizer, the water, and the coupling solvent substantially remain, though it is not critical that all of the neutralizer, water, and coupling solvent remain during this step. The use of vacuum distillation is preferred in order to strip out the volatile hydrophilic organic solvent without requiring an elevated temperature. For this process, it is preferred that the maximum temperature of the dispersion remain below about 75° C. and that the vacuum applied be in the range of about 50 to 400 mm Hg. Residual volatile hydrophilic organic solvent content is preferably less than about 2%, or less than about 0.5%.

The process may be used to prepare dispersions that range in solids content from about 5 to about 40%, or from about 10 to about 30%. The final solvent content of the dispersion prepared from this process is generally less than about 10%, or less than about 6%, or less than about 5%, or from about 1% to about 10%. This process does not require the use of surfactant, such that no surfactant need be present, and the mean volume particle size of the dispersions will typically be less than about 400 nm, or from about 50 nm to about 500 nm. In addition, the volatile hydrophilic organic solvent that is utilized serves to reduce viscosity during the preparation of the dispersion such that extremely high shear rates are not required (as they would be for a conventional dispersion). The final viscosities of the dispersions typically range from about 10 to 500 cP, or from about 20 to about 350 cP. If desired, additional neutralizer may be added to these surfactant-free aqueous dispersions of a carboxylated cellulose ester in order to prepare an aqueous solution in which the neutralized ester is completely solubilized by the blend of water and less volatile coupling solvent.

In order to evaluate the stability of these surfactant-free aqueous dispersions, the dispersions are held in an oven at 50° C. and checked weekly for appearance for a period of 4 weeks. For these dispersions, it is preferable that no settling be seen after about 2 weeks at elevated temperature, or that no settling be observed for the full 4 week period.

In one embodiment, the aqueous ester dispersion may be further neutralized into an aqueous solution which may be used as an additive in a waterborne automotive basecoat system for improved properties related to aluminum flake orientation, quick dry-to-touch, flow and leveling, and defect reduction. Due to the reductions in organic solvent content in the dispersion prepared according to this invention, the total VOC in a representative waterborne automotive basecoat may be reduced by approximately 50% with no negative impact on the appearance or performance of the coating. In other embodiments, the dispersions are used in waterborne wood coatings, teletronic applications, and waterborne architectural and industrial maintenance coatings.

Hydrophilic Organic Solvent

The volatile hydrophilic organic solvents will typically dissolve the carboxylated cellulose ester at concentrations of at least 10 percent by weight, or at least 25 percent by weight, or at least about 40 percent by weight, or from about 5% to about 75% percent by weight. In addition, the volatile hydrophilic organic solvents typically have evaporation rates (relative to n-butyl acetate) of at least 1.0, or at least about 2.0, or from about 1.0 to about 15, or from about 2.0 to about 10. The volatile hydrophilic organic solvent typically has a solubility of at least 5 weight percent, or at least about 10 weight percent, in water, or from about 5% to about 100%. Ketone solvents are suitable for use as the volatile hydrophilic organic solvent, with methyl ethyl ketone and acetone being especially suitable.

Hydrophilic organic solvents may include alcohols such as methanol, ethanol, propanol, and isopropanol. Further hydrophilic organic solvents include ketones such as acetone, methyl ethyl ketone, and methyl propyl ketone, as well as solvents such as tetrahydrofuran and dioxane.

The organic solvent solution of the carboxylated cellulose ester is typically prepared such that it includes from about 1 part to about 5 parts volatile hydrophilic organic solvent per part of ester, or from about 2 parts to about 4 parts of volatile hydrophilic organic solvent per part of ester.

Coupling Solvent

Coupling solvents are those having sufficient solubility in both the aqueous and organic phases to promote the solubility of a neutralized resin in water. The coupling solvent should have a sufficiently low evaporation rate, relative to the volatile hydrophilic organic solvent, such that the volatile hydrophobic organic solvent may be stripped out preferentially during the final stage of the dispersion preparation. Suitable coupling solvents typically have an evaporation rate (relative to n-butyl acetate) of less than about 0.5, or less than about 0.2, or from about 0.001 to about 0.5, or from about 0.01 to about 0.2. Efficient coupling solvents should also have some measure of water solubility, which is typically greater than about 3%, or greater than about 5%, or from about 3% to about 100%. Further, the coupling solvent should have sufficient solvency for the ester at the requisite concentrations. For example, the coupling solvent will typically dissolve the ester at concentrations of at least 10 percent by weight, or at least 25 percent by weight, or at least 40 percent by weight, or from about 5% to about 75% by weight.

Glycol ethers are one type of coupling solvent, although alcohols and glycol ether esters may also be used. Glycol ethers include, but are not limited to, ethylene glycol monopropyl ether, ethylene glycol monobutyl ether, 3-methoxybutanol, propylene glycol monopropyl ether, propylene glycol monobutyl ether, diethylene glycol monoethyl ether, diethylene glycol monopropyl ether, diethylene glycol monobutyl ether, dipropylene glycol monopropyl ether, and dipropylene glycol monobutyl ether. Preferred coupling solvents include ethylene glycol monobutyl ether, 3-methoxybutanol, propylene glycol monopropyl ether, propylene glycol monobutyl ether, diethylene glycol monopropyl ether, diethylene glycol monobutyl ether, dipropylene glycol monopropyl ether, and dipropylene glycol monobutyl ether.

The less volatile coupling solvent is typically incorporated into the organic solvent blend (excluding water and neutralizer) at no more than about 0.5 parts per part of ester, or no more than about 0.3 parts per part of ester, or from about 0.1 part per part of ester to about 0.5 parts per part of ester, or from about 0.15 parts per part of ester to about 0.35 parts per part of ester.

Neutralizer

Suitable neutralizers are bases, such as ammonia or an amine, and include, but are not limited to, dimethylethanolamine, triethanolamine, 2-amino-2-methyl-1-propanol, ammonia, piperidine, 4-ethylmorpholine, diethanolamine, ethanolamine, tributylamine, dibutylamine, potassium hydroxide, and sodium hydroxide. Preferred neutralizers include dimethylethanolamine, triethanolamine, and 2-amino-2-methyl-1-propanol. The amount of neutralizer used depends on the choice of solvent, and the molecular weight, composition, and acid number of the ester. For a typical carboxymethyl cellulose acetate butyrate with an acid number in the range of about 30 to about 100, or from about 50 to about 75, the level of neutralization may range from about 5% to about 50%, or from about 10% to about 30%, based on the number of available carboxyl moieties.

In alternative embodiments, the neutralizer may be added to one or another of the solvents prior to addition of the ester, or the ester may be swelled with the neutralizer prior to addition to the mixture, or the neutralizer may be added to the water, which is then added to the solvent mixture, as already described.

It should be noted that the use of esters with higher acid numbers, for example more than about 100, or more than about 125, can result in films having undesirable properties such as water sensitivity and poor redissolve resistance. Although esters with higher acid numbers may be more readily dispersed in water with less solvent content, esters having higher acid numbers may not be desirable due to the tradeoffs in performance properties.

Carboxylated Cellulose Esters

A wide variety of carboxylated cellulose esters are suitable for use according to the invention. Such esters may have a carboxyl functionality, expressed as an acid value, of from about 10 to about 150, or from about 20 to about 120 and a degree of ester substitution per anhydroglucose unit from about 1.0 to about 3.0, or from about 1.3 to about 2.8. The number average molecular weight of the carboxylated cellulose esters may range from about 1000 to about 50,000, or from about 2000 to about 40,000, and the inherent viscosity, as measured in a 60/40 (wt./wt.) solution of phenol/tetrachloroethane at 25° C., may range from about 0.05 to about 2.0, or from about 0.1 to about 1.5.

In one aspect, the carboxyalkyl cellulose esters suitable for use according to the invention are ether-ester derivatives of cellulose, which combine a carboxyalkyl ether (such as carboxymethyl) substituent and a lower alkyl ester substituent, preferably a $C_2$–$C_4$ ester substituent, such as propionyl, mixed acetyl/propionyl, butyryl, or mixed acetyl/butyryl ester substituents, although carboxymethyl cellulose acetate is also a useful ester according to the present invention. U.S. Pat. Nos. 5,668,273, 5,792,856, 5,994,530 describe such esters, and the disclosures of these patents are herein incorporated by reference in their entirety.

These carboxyalkyl cellulose esters may have a high combined degree of substitution (DS) per anhydroglucose unit on the cellulose backbone of ether and ester functions in the trisubstituted or partially hydrolyzed form (generally <0.70 DS hydroxyl). These esters are typically soluble in a wide range of organic solvents, allowing formulators a wide latitude of solvent choice when organic solvent solutions are employed. They are readily dispersed in waterborne formulations when organic solvent solutions of the esters are treated with ammonia or an amine, but the process used heretofore resulted in coating formulations having a significant VOC content.

These esters of carboxy ($C_1$–$C_3$ alkyl) cellulose may, for example, have an inherent viscosity of 0.20 to 0.70 dLg, or from 0.35 to 0.60 dLg, as measured in a 60/40 (wt./wt.) solution of phenol/tetrachloroethane at 25° C., a degree of substitution per anhydroglucose unit of carboxy ($C_1$–$C_3$ alkyl) of about 0.20 to 0.75, and a degree of substitution per anhydroglucose unit of $C_2$–$C_4$ esters of about 1.5 to about 2.7.

Carboxymethyl cellulose butyrates may be used having a degree of substitution per anhydroglucose unit of carboxymethyl of 0.20 to 0.75, a degree of substitution per anhydroglucose unit of hydroxyl from about 0.10 to 0.70, and a degree of substitution per anhydroglucose unit of butyryl of about 1.50 to 2.70, and having an inherent viscosity of 0.20 to 0.70 dL/g, as measured in a 60/40 (wt./wt.) solution of phenol/tetrachloroethane at 25° C. Similarly, a carboxymethyl cellulose propionate may be used having a degree of substitution per anhydroglucose unit of carboxymethyl of 0.20 to 0.75, a degree of substitution per anhydroglucose unit of hydroxyl from about 0.10 to 0.70, and a degree of substitution per anhydroglucose unit of propionyl of about 1.50 to 2.70, and having an inherent viscosity of 0.20 to 0.70 dL/g, as measured in a 60/40 (wt./wt.) solution of phenol/tetrachloroethane at 25° C. A carboxymethyl cellulose acetate butyrate likewise may be used having a degree of substitution of carboxymethyl of 0.20 to 0.75, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65, and having an inherent viscosity of 0.20 to 0.70 dL/g, as measured in a 60/40 (wt./wt.) solution of phenol/tetrachloroethane at 25° C. A carboxymethyl cellulose acetate propionate may also be used having a degree of substitution per anhydroglucose unit of carboxymethyl of 0.20 to 0.75, a degree of substitution per anhydroglucose unit of hydroxyl from about 0.10 to 0.70, and a degree of substitution per anhydroglucose unit of propionyl of about 0.10 to 2.60 and a degree of substitution per anhydroglucose unit of acetyl of about 0.10 to 2.65, and having an inherent viscosity of 0.20 to 0.70 dL/g, as measured in a 60/40 (wt./wt.) solution of phenol/tetrachloroethane at 25° C.

These carboxymethyl cellulose esters, i.e., CMC propionate, CMC acetate propionate, CMC butyrate, and CMC acetate butyrate, as described above, exhibit solubility soluble in most classes of typical coating solvents including ketones, esters, alcohols, glycol ethers, and glycol ether esters, while tolerating dilution with water or aromatic hydrocarbons. Examples of typical solvents include acetone, methyl ethyl ketone, methyl isobutyl ketone, methyl amyl ketone, methyl isoamyl ketone, 2-propoxyethanol, 2-butoxyethanol, ethyl 3-ethoxypropionate, ethanol, propanol, isopropyl alcohol, butanol, 2-ethylhexanol, ethyl acetate, propyl acetate, isopropyl acetate, butyl acetate, isobutyl acetate, ethylene glycol diacetate, and other volatile inert solvents typically used in coating compositions. These carboxyalkyl cellulose esters are useful as rheology modifiers; are relatively hard polymers, i.e., about 12 Knoop Hardness Units (KHU); and have high glass transition temperatures. They can be added to other resins to improve the coating hardness and to improve properties such as slip, sag resistance, and mar resistance. To further improve the toughness, crosslinkers such as melamines or isocyanates may be added to react with these esters or with other resins. When incorporated in the aqueous dispersions according to the invention, they provide these excellent film properties, while not contributing significantly to the total VOC content.

These esters typically possess free hydroxyl groups, and thus can also be utilized in conjunction with crosslinking agents such as melamines and isocyanates. In this regard, preferred cross-linking agents include hexamethoxymethylamine, tetramethoxymethylbenzo-guanamine, tetramethoxymethylurea, mixed butoxy/methoxy substituted melamines, and the like. The most preferred melamine cross-linking agent is hexamethoxymethylamine. Typical isocyanate crosslinking agents and resin include hexamethylene diisocyanate (HMDI), isophorone diisocyanate (IPDI), and toluene diisocyanate.

Since free carboxyl groups typically remain following neutralization, one can use the usual crosslinkers and resins used with carboxyl functional resins, e.g., epoxy resins or glycidyl-functional resins. Preferred epoxy functional resins generally have a molecular weight of about 300 to about 4000, and have approximately 0.05 to about 0.99, epoxy groups per 100 g of resin (i.e., 100–2000 weight per epoxy (WPE)). Such resins are widely known and are commercially-available under the EPON® trademark of the Shell Chemical Company, the ARALDITE® trademark of CIBA-Geigy, and D.E.R. resins of the Dow Chemical Company.

These carboxyalkyl cellulose esters typically have a range of acid numbers from about 40 to 130, and those having hydroxyl levels of about 0.15 (essentially trisubstituted, i.e., no or little hydrolysis), 0.25, and 0.5 DS have been shown to be compatible with alkyd and polyisocyanate resins. Methyl isobutyl ketone is one of many suitable solvents.

Conventionally, these carboxyalkyl cellulose esters are utilized in waterborne coating compositions by being dissolved in organic solvents, partially neutralized, and dispersed in water. Examples of such solvents include but are not limited to 2-butanone, methyl amyl ketone, methanol, ethanol, ethyl 3-ethoxypropionate, ethylene glycol monoethyl ether, ethylene glycol monopropyl ether, and ethylene glycol monobutyl ether and the like. Dispersions of these modified cellulose esters typically have required about 25 to about 100% neutralization of the pendant carboxylate groups with an amine. Typical amines used have included ammonia, piperidine, 4-ethylmorpholine, diethanolamine, triethanolamine, ethanolamine, tributylamine, dibutylamine, and dimethylamino ethanol.

Another group of suitable carboxylated cellulose esters for use according to the invention, such as those described in U.S. Pat. No. 5,973,139, the disclosure of which is incorporated herein by reference, include carboxylated cellulose esters prepared from oxidized cellulose.

Any oxidized cellulose starting material may be used to prepare such esters. For example, oxidized cellulose starting material can be obtained from Rayonier in Jesup, Ga. Alternatively, the oxidized cellulose may be formed by oxidizing cellulose materials by conventional methods which are well known in the art. For example, cellulose materials can be bleached with an oxidizing agent, such as, hypochlorite. Preferably, the carboxyl content of such oxidized cellulose materials is at least about 30 meq/kg, more preferably, ranging from about 47 to about 77 meq/kg.

To prepare these esters, oxidized cellulose is activated with water, preferably with demineralized water. The water-activated oxidized cellulose is then dehydrated by washing with acetic acid in order to displace the water with acetic acid. Depending upon the desired cellulose ester, the water activated cellulose may be further washed with butyric acid or propionic acid in order to displace the acetic acid with butyric or propionic acid, thereby obtaining cellulose acetate butyrate or cellulose acetate propionate respectively. If the desired carboxylated cellulose ester is cellulose acetate, the activated cellulose is washed only with acetic acid.

After the dehydration step, the activated cellulose is reacted with an esterifying reagent in the presence of a catalyst at an initial temperature of about 0° C. The esterifying reagent is selected from acetic acid, propionic acid, butyric acid, their anhydrides, and mixtures thereof. The esterifying reagent may be present in an amount ranging from about 10.0 moles to about 3.0 mole relative to one mole of the anhydroglucose unit of the cellulose. The selection of the esterifying reagent is governed by the desired carboxylated cellulose ester. For example, if cellulose acetate is desired, the esterifying reagent may be acetic acid and/or acetic anhydride. Similarly, if cellulose acetate butyrate is desired, the esterifying reagent may be a mixture of acetic acid and/or acetic anhydride and butyric acid and/or butyric anhydrides. When a mixture of esterifying reagents is used, the preferred amount of acetic acid or anhydride ranges from about 0.1 to 3.0 moles and the preferred amount of butyric acid or propionic acid or anhydrides thereof ranges from about 0.6 to about 6.0 moles.

In the esterification step, when carboxylated cellulose acetate butyrate is the desired cellulose ester, the degree of substitution of butyryl groups may range from about 0.5 to about 2.95 and the degree of substitution of acetyl groups may range from about 0.4 to about 2.95. Similarly, when carboxylated cellulose acetate propionate is desired, the degree of substitution of propyl groups may range from about 0.5 to about 2.95 and the degree of substitution of acetyl groups may range from about 0.4 to about 2.95. Preferably, in the carboxylated cellulose acetate butyrates and propionates, the degree of substitution of propionate or butyrate ranges from about 1 to about 2.5 and the preferred degree of substitution of acetate ranges from about 0.4 to about 1.6. Carboxylated cellulose acetates prepared by the above process generally have a degree of substitution of acetyl groups ranging from about 2.0 to about 2.95.

The intrinsic viscosity of such carboxylated cellulose esters typically ranges from about 0.2 to about 1.6, or from about 0.2 to about 0.9 dl/g, and is obtained by adjusting the reaction time and temperature. For example, the initial reaction temperature is maintained at about 0° C. The temperature is then gradually increased to a level sufficient to complete reaction and to obtain the desired viscosity.

After the activated cellulose is reacted, the esterified carboxylated cellulose may be hydrolyzed to obtain a degree of substitution of hydroxyl groups which may range from about 0.05 to about 1.0. The rate of hydrolysis may be controlled by temperature and catalyst concentration with higher temperatures and catalyst concentrations increasing the rate of hydrolysis. Preferred hydrolysis reactions can be performed with a 90:10 acetic acid/water mixture in the presence of acid catalyst at temperatures ranging from about 30° C. to about 70° C. The extent of hydrolysis may also be increased by adding more acetic acid/water mixture in sequential steps.

When the desired degree of substitution of the hydroxyl group in the carboxylated cellulose ester is achieved, hydrolysis is stopped by neutralizing the catalyst in the solution from the reaction step. Methods for monitoring the degree of substitution of hydroxyl groups are known in the art and include, for example, IR, NMR, and pyrolysis gas chromatography. The neutralizing agent can be any basic component. Examples of suitable neutralizing agents include, but are not limited to, magnesium acetate, calcium acetate, sodium acetate, pyridine, or mixtures thereof. The period of time to achieve the desired degree of substitution may be predetermined by methods known in the art.

Once the desired degree of hydrolysis is reached, the solution may be filtered by methods known in the art. The carboxylated cellulose ester is then precipitated from the reaction solution by conventional methods known in the art.

Various carboxylated cellulose esters may be made by the process described above. Such carboxylated cellulose esters include, for example, carboxylated cellulose acetate, carboxylated cellulose acetate butyrate, carboxylated cellulose acetate propionate, carboxylated cellulose propionate butyrate and carboxylated cellulose acetate propionate butyrate. Preferred carboxylated cellulose esters may include, for example, carboxylated cellulose acetate, carboxylated cellulose acetate butyrate and carboxylated cellulose acetate propionate.

Carboxylated cellulose acetates made by the above described process may have a degree of substitution of hydroxyl groups ranging from about 0.05 to about 1.0, a degree of substitution of acetyl groups ranging from about 2.0 to about 2.95 and an intrinsic viscosity ranging from about 0.2 to about 1.6 dl/g, or from about 0.2 to about 0.9 dl/g.

Carboxylated cellulose acetate propionates made by this process have a degree of substitution of hydroxyl groups ranging from about 0.05 to about 1.0; a degree of substitution of propyl groups ranging from about 0.5 to about 2.95; a degree of substitution of acetyl groups ranging from about 0.4 to about 2.95; and an intrinsic viscosity ranging from about 0.2 to about 1.6 dl/g, or from about 0.2 to about 0.9 dl/g.

Carboxylated cellulose acetate butyrates prepared by this process may have a degree of substitution of hydroxyl groups ranging from about 0.05 to about 1.0; a degree of substitution of butyryl groups ranging from about 0.5 to about 2.95; a degree of substitution of acetyl groups ranging from about 0.4 to about 2.95; and an intrinsic viscosity ranging from about 0.2 to about 1.6 dl/g, or from about 0.2 to about 0.9 dl/g.

These carboxylated cellulose esters are known to be compatible with a number of solvents. These solvents include, but are not limited to, methanol; methylene chloride; diacetone alcohol; lower alkanoic acids, such as formic acid, acetic acid, and propionic acid; lower alkyl ketones, such as acetone, methyl ethyl ketone, methyl propyl ketone, methyl isobutyl ketone, and methyl n-amyl ketone; esters, such as methyl acetate, ethyl acetate, isopropyl acetate, n-propyl acetate, n-butyl acetate, 2-ethylhexyl acetate, isobutyl acetate, 2-butoxy-ethyl acetate, 1-methoxy-2-propyl acetate, 2-ethoxy-ethyl acetate, ethyl-3-ethoxypropionate, isobutyl isobutyrate, and 2,2,4-trimethyl-1,3-pentanediol monoisobutyrate; ethers such as ethylene glycol monobutyl ether, propylene glycol monopropyl ether, 2-ethoxyethanol, 2-propoxyethanol, and 2-butoxyethanol, and mixtures thereof. Also, mixtures of solvents, such as mixtures of toluene and/or xylene with ethanol and mixtures of ethanol with esters, such as ethyl acetate, 1-methoxy-2-propyl acetate and the like may be used. Of course, the above listing is not intended to be exhaustive, but is indicative of the variety of solvents which may be employed in conjunction with these carboxylated cellulose esters.

These carboxylated cellulose esters are also known to be compatible with a wide range of resinous materials such as those used in coating and ink compositions. Classes of resins with which these carboxylated cellulose esters are compatible include, but are not limited to, thermoplastic acrylics, thermoset acrylics, silicone resins, alkyd resins, ordinary cellulose esters, urea formaldehyde resins, melamine resins, urethanes, nitrocellulose, unsaturated and other thermosetting polyester resins.

Other suitable carboxylated cellulose esters useful according to the invention include those described in U.S. Pat. No. 4,590,265, the disclosure of which is incorporated herein by reference in its entirety. These carboxylated cellulose esters are manufactured by reacting ordinary cellulose esters with ozone. Specific cellulose esters which are useful in the preparation of these carboxylated cellulose esters include cellulose acetate, cellulose propionate, cellulose butyrate, cellulose acetate butyrate, cellulose acetate propionate, mixtures thereof, etc.

In the manufacture of these carboxylated cellulose esters, the cellulose ester starting material is provided to a reaction zone in a form which is suitable for reaction with ozone. For example, it is possible to provide the cellulose ester in the form of a solution in an appropriate solvent (i.e., one in which both the cellulose ester starting material and the carboxylated cellulose ester product are soluble), as an aqueous slurry, or, preferably, in a solid particulate form. More preferably, the cellulose ester is provided in the form of a powder. In the reaction zone, the cellulose ester is intimately contacted with a gaseous stream comprising ozone. Most preferably, the gaseous stream containing ozone is passed through a distributor plate and through a cellulose ester powder so as to create a fluidized solid. The gaseous stream preferably comprises at least about 0.25 weight percent ozone, based upon the total weight of gas present in the reaction system. The reaction is conducted at a temperature of about 25° to 80° C. (preferably about 50° to 75° C.). The cellulose ester is reacted with the ozone for a period of time sufficient to yield a carboxylated cellulose ester product. Commonly, desirable products are obtained by reacting the cellulose ester starting material with ozone for a period of time of at least about 0.5 hour.

Typically, these carboxylated cellulose ester products have an acid number of at least about 5. Typically, the acid number of the carboxylated cellulose ester is from about 10 to about 35, or from about 15 to about 30. These carboxylated cellulose esters may be characterized further by determining indirectly the molecular weight of the product, e.g., by inherent viscosity. These carboxylated cellulose esters typically exhibit an inherent viscosity of from about 0.01 to about 1.00, or about 0.05 to 0.5.

These esters include the acetates, butyrates and propionates, all hereinafter termed XAE, and may be described as polymeric chains of anhydroglucose units having ring substituents comprising by weight based on total polymer weight, from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups (terms include water soluble or water dispersible salts thereof)

wherein from about 20% to 100%, preferably from about 30% to 100% of these carboxyl groups are non-saponifiable backbone (BBC), i.e., attached at their α-carbons directly to the anhydroglucose rings, and wherein the XAE contains from about $4.52*10^{-5}$ to about $6.13*10^{-4}$ moles of lactone moiety per gram of XAE, hereinafter termed "lactone level". In general, the XAE is further characterized as having an acid number (AN) from about 5 to about 50, a DP/COOH of from about 5 to about 80, and an I.V. (inherent viscosity) of from about 0.07 to about 0.45.

Other suitable carboxylated cellulose esters are known that can be prepared via ozonation of cellulose. For example, a process for carboxylating cellulose ester has been described by I. D. Sand in "The Properties and Applications of Ozonolyzed Cellulose Acetate Butyrate," Polymer Material Science Engineering, 1987, pp. 57–63, incorporated herein by reference. In this process, the hydroxyl groups of cellulose acetate butyrate are oxidized in the presence of ozone to produce an oxidized or carboxylated cellulose acetate butyrate. According to Sand, carboxylated cellulose acetate butyrates have a lower molecular weight than conventional non-carboxylated cellulose acetate butyrates. As a result, the carboxylated cellulose acetate butyrates are soluble in a broader range of solvents and are compatible with a wider range of resins than the conventional cellulose acetate butyrates. Unfortunately, however, in addition to the carboxyl group, the ozone treatment described by Sand also generates peroxide, aldehyde and ketone functional groups in the cellulose ester.

Similarly, European Patent Application No. 138,703, incorporated herein by reference, describes a process for preparing carboxylated cellulose esters by reacting a cellulose ester with ozone. However, like the process described by Sand, in the process described by this European Patent Application, peroxide, aldehyde, and ketone functional groups are generated in the cellulose esters in addition to the carboxyl group.

Another type of carboxylated cellulose esters suitable for use according to the invention are those in which the cellulose is ester-functionalized with dicarboxylic acids, such as those described in U.S. Pat. Nos. 2,768,161, 2,856,400, and 5,384,163, and those documents referenced therein, all of which are incorporated herein by reference in their entirety. Dicarboxylic acids or anhydrides useful for this purpose are said to include phthalic, succinic, maleic, and mixtures of these.

Similarly, carboxylated cellulose esters having unsaturated pendant groups are likewise suitable for use according to the invention, such as those disclosed in U.S. Pat. No. 5,981,738, the disclosure of which is incorporated herein by reference in its entirety. These esters may be prepared by reacting a cellulose ester containing residual hydroxyl groups with, for example, maleic anhydride in acetic acid solvent with sodium acetate catalyst. These cellulose esters are not homopolymerizable, but will copolymerize in the presence of vinyl crosslinking agents and a photoinitiator upon exposure to ultraviolet radiation, making them useful in protective and decorative coatings for wood, metal, plastics, paper, board, and other substrates.

Waterborne Automotive Basecoat Compositions

The aqueous ester dispersions of the invention may be further neutralized into an aqueous solution, which may be used as an additive in a waterborne automotive basecoat system for improved properties related to aluminum flake orientation, quick dry-to-touch, flow and leveling, and defect reduction. Due to the reductions in organic solvent content in the dispersion prepared according to the invention, the total VOC in a representative waterborne automotive basecoat may be reduced by approximately 50% with no negative impact on the appearance or performance of the coating.

Metallic Flake Coating Compositions

In metallic coatings, used for example in teletronics applications, the solids level of the formulation significantly influences the metal flake orientation, which is manifested by observing the coating at different angles of illumination and monitoring the change in apparent brightness, commonly referred to as "flop." As the solids level increases, the flake orientation becomes more random causing an uneven luster and appearance. Typical metallic coating formulations require from about 20 to about 30 percent of carboxylated cellulose ester to achieve satisfactory metal flake orientation. However, some carboxylated cellulose esters can be formulated into metallic coating compositions containing as little as 5 percent, based on the resin solids, of carboxylated cellulose ester and still having satisfactory metal flake orientation.

Other Coating Compositions

In other embodiments, the dispersions according to the invention are used in waterborne wood coatings, teletronic applications, and waterborne architectural and industrial maintenance coatings.

Coating Formulation Additives

As a further aspect of the present invention, the above compositions may be further comprised of one or more coatings additives. Such additives are generally present in a range of about 0.1 to 15 weight percent, based on the total weight of the composition. Examples of such coatings additives include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of additional coatings additives can be found in Raw Materials Index, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark SYLOID®; polypropylene, available from Hercules Inc., under the trademark HERCOFLAT®; synthetic silicate, available from J. M Huber Corporation under the trademark ZEOLEX®.

Examples of dispersing agents and surfactants include sodium bis(tridecyl)sulfosuccinnate, di(2-ethyl hexyl)sodium sulfosuccinnate, sodium dihexylsulfosuccinnate, sodium dicyclohexyl sulfosuccinnate, diamyl sodium sulfosuccinnate, sodium diisobutyl sulfosuccinate, disodium isodecyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRUBREAK of Buckman Laboratories Inc., under the BYK® trademark of BYK Chemie, U.S.A., under the FOAMASTER® and NOPCO® trademarks of Henkel Corp./Coating Chemicals, under the DREWPLUS® trademark of the Drew Industrial Division of Ashland Chemical Company, under the TROYSOL® and TROYKYD® trademarks of Troy Chemical Corporation, and under the SAG® trademark of Union Carbide Corporation.

Examples of fungicides, mildewcides, and biocides include 4,4-dimethyloxazolidine, 3,4,4-trimethyl-oxazolidine, modified barium metaborate, potassium N-hydroxymethyl-N-methyldithiocarbamate, 2-(thiocyano-methylthio) benzothiazole, potassium dimethyl dithiocarbamate, adamantane, N-(trichloromethylthio)phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the tradename Cyasorb UV, and available from Ciba Geigy under the trademark TINUVIN, and diethyl-3-acetyl-4-hydroxy-benzyl-phosphonate, 4-dodecyloxy-2-hydroxy benzophenone, and resorcinol monobenzoate.

To prepare the coated articles of the present invention, the formulated coating composition containing carboxylated cellulose esters may be applied to a substrate and may either be allowed to air dry or baked. The substrate can be, for example, wood; plastic; metal such as aluminum or steel; cardboard; glass; cellulose acetate butyrate sheeting; and various blends containing, for example, polypropylene, polycarbonate, polyesters such as polyethylene terephthalate, acrylic sheeting, as well as other solid substrates.

Pigments suitable for use in the coating compositions envisioned by the present invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1.

A listing of the relative evaporation rates (relative to n-butyl acetate) of various solvents can be found in Eastman Chemical Company Publication M-167Y (October, 2003) entitled "Solvent Selector Chart".

The following terms have the indicated meanings, in the absence of contrary language elsewhere in this disclosure:

"Neutralizer" refers to compositions which can associate with carboxyl functionality on the cellulose esters to assist in water dispersibility. Examples of neutralizers useful in the present invention include amines, ammonia, and metal hydroxides including NaOH and KOH. In an important aspect of the invention, the neutralizers are amines and/or ammonia.

"Substantially free of a surfactant" means a composition with not more than about 0.1 weight percent surfactant. Aqueous dispersions of the present invention can provide effective coatings even where they are substantially free of an effective amount of surfactant.

As used herein, the reaction product of an amine, ammonia or other base with a carboxyl group produces a "salt".

"Solvent" means an organic solvent.

"Organic solvent" means a liquid which includes but is not limited to carbon and hydrogen, wherein the liquid has a boiling point in the range of not more than about 280° C. at about one atmosphere pressure.

"Hydrophilic solvent" means a solvent that has a solubility in water of at least about 5 weight percent.

"Dispersion" in respect to a polymeric vehicle, formulated coating composition, or components thereof means that the composition includes a liquid and dispersed particles that are detectable by light scattering.

"Dissolved" in respect to a polymeric vehicle, formulated coating composition or components thereof means that the material which is dissolved does not exist in a liquid in particulate form where particles larger than single molecules are detectable by light scattering.

"Soluble" means a liquid or solid that can be partially or fully dissolved in a liquid. "Miscible" means liquids with mutual solubility.

"Acid number" or "acid value" means the number of milligrams of potassium hydroxide required for neutralization of or reaction with ionizable groups present in 1 g of material, such as a cellulose ester.

"Substantially free of an effective amount of emulsifier" means a composition with not more than about 0.5 weight percent emulsifiers based on resin solids. Aqueous dispersions of the present invention may be substantially free of an effective amount of emulsifier.

"Substantially free of an effective amount of surfactant" means a composition with not more than about 0.5 weight percent surfactant based on resin solids. Aqueous dispersions of the present invention may be substantially free of an effective amount of a surfactant.

As used herein, the term "stable aqueous dispersion" refers to dispersions which include resins having a mean volume particle size of less than about 500 nanometers and do not irreversibly separate after about 2 weeks at 120° F.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Preparation of a Carboxymethyl Cellulose Acetate Butyrate (CMCAB) Dispersion of the Present Invention 100.4 grams of CMCAB 641-0.5 (available from Eastman Chemical Company, Kingsport, Tenn.) was combined with 376.3 grams of methyl ethyl ketone (Aldrich MEK, relative evaporation rate 3.8), and 25.5 grams of ethylene glycol monobutyl ether (Eastman EB, available from Eastman Chemical Company, relative evaporation rate 0.09), in a 32 ounce jar which was allowed to roll overnight until a homogeneous solution was obtained.

The above solution of CMCAB, MEK, and EB (502.2 grams) was charged to a three-neck, 2 liter round bottom flask equipped with a nitrogen purge, thermocouple and a mechanical stirrer with a condenser, receiver, and dry ice trap configured for vacuum distillation. A heating mantle was provided under the round bottom flask. The solution in the flask was heated to 30° C. under mild agitation. A mixture of 1.94 grams of dimethylethanolamine (Aldrich—equivalent to 20% neutralization of the CMCAB, which has an acid number of 60) and 375.0 grams of distilled water was prepared and added dropwise to the solution in the round bottom flask over a period of 20 minutes. The temperature of the dispersion in the flask was raised to 40° C. and held for about 25 minutes. A vacuum of approximately 250 mm Hg was applied to the dispersion and the temperature was very gradually ramped up to a final value of 46° C. over a period of two hours and held for about 1.3 hours. The solids content was determined to be about 23%, which was greater than the desired solids content of 20%. 77.4 grams of distilled water was added to the dispersion, under mild agitation, in order to achieve the target solids. The resulting product was analyzed for solids (19.7%), pH (4.7), viscosity (65 cP), residual MEK content (by gas chromatography, less than 0.01%), mean volume particle size (275 nm), and heat stability at 50° C. (greater than 2 weeks). The calculated solvent content was 5.0%.

Example 2

Preparation of a Carboxymethyl Cellulose Acetate Butyrate (CMCAB) Dispersion of the Present Invention 100.7 grams of CMCAB 641-0.5 (Eastman Chemical) was combined with 376.3 grams of methyl ethyl ketone (Aldrich MEK, relative evaporation rate 3.8) and 25.5 grams of 3-methoxybutanol (Celanese, relative evaporation rate 0.08) in a 32 ounce jar which was allowed to roll overnight until a homogeneous solution was obtained. The above solution of CMCAB, MEK, and 3-methoxybutanol (502.5 grams) was charged to a three-neck, 2 liter round bottom flask equipped with a nitrogen purge, thermocouple and a mechanical stirrer with a condenser, receiver, and dry ice trap configured for vacuum distillation. A heating mantle was placed under the round bottom flask. The solution in the flask was heated to 30° C. under mild agitation. A mixture of 1.94 grams of dimethylethanolamine (Aldrich—equivalent to 20% neutralization of the CMCAB, which has an acid number of 60) and 375.0 grams of distilled water was prepared and added dropwise to the solution in the round bottom flask over a period of 17 minutes. The temperature of the dispersion in the flask was raised to 40° C. and held for 48 minutes. A vacuum of approximately 225 mm Hg was applied to the dispersion and the temperature was very gradually ramped up to a final value of 45° C. over a period of about two hours and held for about 1.5 hours. The solids content was determined to be about 23%, which was greater than the desired solids content of 20%. 66.3 grams of distilled water was added to the dispersion under mild agitation in order to achieve the target solids. The resulting product was analyzed for solids content (19.8%), pH (5.2), viscosity (63 cP), residual MEK content (by gas chromatography, less than 0.01%), mean volume particle size (330 nm), and heat stability at 50° C. (greater than 4 weeks). The calculated solvent content was 5.0%.

Example 3

Preparation of a Carboxymethyl Cellulose Acetate Butyrate (CMCAB) Dispersion of the Present Invention 100.4 grams of CMCAB 641-0.5 (Eastman Chemical Company) was combined with 376.3 grams of methyl ethyl ketone (Aldrich MEK, relative evaporation rate 3.8) and 25.5 grams of propylene glycol monopropyl ether (Dowanol® PnP, relative evaporation rate 0.2) in a 32 ounce jar which was allowed to roll overnight until a homogeneous solution was obtained. The above solution of CMCAB, MEK, and propylene glycol monopropyl ether (502.2 grams) was charged to a three-neck 2 liter round-bottom flask equipped with a nitrogen purge, thermocouple and a mechanical stirrer with a condenser, receiver, and dry ice trap configured for vacuum distillation. A heating mantle was placed under the round bottom flask. The solution in the flask was heated to 30° C. under mild agitation. A mixture of 1.94 grams of dimethylethanolamine (Aldrich—equivalent to 20% neutralization of the CMCAB, which has an acid number of 60) and 375.0 grams of distilled water was prepared and added dropwise to the solution in the round bottom flask over a period of 20 minutes. The temperature of the dispersion in the flask was raised to 40° C. and held for 45 minutes. A vacuum of approximately 220 mm Hg was applied to the dispersion and the temperature was very gradually ramped up to a final value of 45° C. over a period of about two hours, where it was held for about 35 minutes. The solids content was determined to be about 22%, which was greater than the desired solids content of 20%. 48.5 grams of distilled water was added to the dispersion under mild agitation in order to achieve the target solids. The resulting product was analyzed for solids content (19.2%), pH (5.2), viscosity (133 cP), residual MEK content (by gas chromatography, less than 0.01%), mean volume particle size (396 nm), and heat stability at 50° C. (about 3 weeks). The calculated solvent content was 5.0%.

Example 4

Preparation of a Carboxymethyl Cellulose Acetate Butyrate (CMCAB) Dispersion of the Present Invention 100.7 grams of CMCAB 641-0.5 (Eastman Chemical Company) was combined with 376.3 grams of methyl ethyl ketone (Aldrich MEK, relative evaporation rate 3.8) and 25.5 grams of propylene glycol monobutyl ether (Lyondell PnB, relative evaporation rate 0.08) in a 32 ounce jar which was allowed to roll overnight until a homogeneous solution was obtained. The above solution of CMCAB, MEK, and propylene glycol monobutyl ether (502.5 grams) was charged to a three-neck, 2 liter round-bottom flask equipped with a nitrogen purge, thermocouple and a mechanical stirrer with a condenser, receiver, and dry ice trap configured for vacuum distillation. A heating mantle was placed under the round bottom flask. The solution in the flask was heated to 30° C. under mild agitation. A mixture of 1.94 grams of dimethylethanolamine (Aldrich—equivalent to 20% neutralization of the CMCAB, which has an acid number of 60) and 375.0 grams of distilled water was prepared and added dropwise to the solution in the round bottom flask over a period of 20 minutes. The temperature of the dispersion in the flask was raised to 40° C. and held for 30 minutes. A vacuum of approximately 230 mm Hg was applied to the dispersion and the temperature was very gradually ramped up to a final value of 45° C. over a period of about two hours where it was held for about 1.3 hours. Solids content was determined to be about 22%, which was greater than the desired solids content of 20%. 44.4 grams of distilled water was added to the dispersion under mild agitation in order to achieve the target solids. The resulting product was analyzed for solids content (19.6%), pH (5.2), viscosity (531 cP), residual MEK content (by gas chromatography, less than 0.12%), mean volume particle size (385 nm), and heat stability at 50° C. (about 2 weeks). The calculated solvent content was 5.1%.

Example 5

Preparation of a Carboxymethyl Cellulose Acetate Butyrate (CMCAB) Dispersion of the Present Invention 100.6 grams of CMCAB 641-0.2 (Eastman Chemical Company) was combined with 350.0 grams of methyl ethyl ketone (Aldrich MEK, relative evaporation rate 3.8) and 50.1 grams of ethylene glycol monobutyl ether (Eastman EB, relative evaporation rate 0.09) in a 32 ounce jar which was allowed to roll overnight until a homogeneous solution was obtained. The above solution of CMCAB, MEK, and EB (500.7 grams) was charged to a four-neck, 1 liter round-bottom flask equipped with a nitrogen purge, addition funnel, thermocouple and a mechanical stirrer with a condenser, receiver, and dry ice trap configured for vacuum distillation. A heating mantle was placed under the round bottom flask. The solution in the flask was heated to 30° C. under mild agitation. 1.45 grams of dimethylethanolamine (Aldrich—equivalent to 15% neutralization of the CMCAB, which has an acid number of 60) was slowly added to the solution in the round bottom flask. 350.6 grams of distilled water was added dropwise to the solution in the round bottom flask over a period of about 30 minutes. The dispersion was held at 30° C. under mild agitation for about 2.5 hours. A vacuum of approximately 255 mm Hg was applied to the dispersion and the temperature was very gradually ramped up to a final value of 50° C. over a period of about 1.3 hours where it was held for an additional two hours. The solids content was determined to be about 29%, which was greater than the desired solids content of 20%. 155.0 grams of distilled water was added to the dispersion under mild agitation in order to achieve the target solids. The resulting product was analyzed for solids content (19.5%), pH (5.7), viscosity (16.1 cP), residual MEK content (by gas chromatography, about 0.07%), mean volume particle size (151 nm), and heat stability at 50° C. (about 3 weeks). The calculated solvent content was about 10.07%.

Example 6

Preparation of a Carboxymethyl Cellulose Acetate Butyrate (CMCAB) Dispersion of the Present Invention 100.2 grams of CMCAB 641-0.5 (Eastman Chemical) was combined with 352.6 grams of methyl ethyl ketone (Aldrich MEK, relative evaporation rate 3.8) and 50.4 grams of ethylene glycol monobutyl ether (Eastman EB, relative evaporation rate 0.09) in a 32 ounce jar which was allowed to roll overnight until a homogeneous solution was obtained. The above solution of CMCAB, MEK, and EB (503.2 grams) was charged to a four-neck, 1 liter round-bottom flask equipped with a nitrogen purge, addition funnel, thermocouple and a mechanical stirrer with a condenser, receiver, and dry ice trap configured for vacuum distillation. A heating mantle was placed under the round bottom flask. The solution in the flask was heated to 30° C. under mild agitation. 1.44 grams of 2-amino-2-methyl-1-propanol (Angus AMP-95®-equivalent to 15% neutralization of the CMCAB, which has an acid number of 60) was slowly added to the solution in the round bottom flask. 350.9 grams of distilled water was added dropwise to the solution in the round bottom flask over a period of about 30 minutes. The dispersion was held at 30° C. under mild agitation for about 1.5 hours. A vacuum of approximately 275 mm Hg was applied to the dispersion and the temperature was very gradually ramped up to a final value of 50° C. over a period of about 1.5 hours where it was held for an additional 45 minutes. The solids content was determined to be about 35%, which was greater than the desired solids content of 20%. 214.0 grams of distilled water was added to the dispersion under mild agitation in order to achieve the target solids. The resulting product was analyzed for solids content (18.9%), pH (5.5), viscosity (17.7 cP), residual MEK content (by gas chromatography, less than 0.01%), mean volume particle size (398 nm), and heat stability at 50° C. (about 3 weeks). The calculated solvent content was 10.0%.

Example 7

Preparation of a Carboxymethyl Cellulose Acetate Butyrate (CMCAB) Dispersion of the Present Invention 100.4 grams of CMCAB 641-0.5 (Eastman Chemical) was combined with 376.3 grams of acetone (Aldrich, relative evaporation rate 6.3) and 25.5 grams of ethylene glycol monobutyl ether (Eastman EB, relative evaporation rate 0.09) in a 32 ounce jar which was allowed to roll overnight until a homogeneous solution was obtained. The above solution of CMCAB, acetone, and EB (502.2 grams) was charged to a three-neck, 2 liter round-bottom flask equipped with a nitrogen purge, thermocouple and a mechanical stirrer with a condenser, receiver, and dry ice trap configured for vacuum distillation. A heating mantle was placed under the round bottom flask. The solution in the flask was heated to 30° C. under mild agitation. A mixture of 1.94 grams of dimethylethanolamine (Aldrich—equivalent to 20% neutralization of the CMCAB, which has an acid number of 60) and 375.0 grams of distilled water was prepared and added dropwise to the solution in the round bottom flask over a period of 18 minutes. The temperature of the dispersion in the flask was raised to 35° C. and held for about 30 minutes. A vacuum of approximately 230 mm Hg was applied to the dispersion and the temperature was very gradually ramped up to a final value of 38° C. over a period of about 1.5 hours where it was held for about 15 minutes. Solids content was determined to be about 21%, which was greater than the desired solids content of 20%. 27.0 grams of distilled water was added to the dispersion under mild agitation in order to achieve the target solids. The resulting product was analyzed for solids content (19.8%), pH (4.3), viscosity (31.9 cP), residual acetone content (by gas chromatography, about 0.3%), mean volume particle size (151 nm), and heat stability at 50° C. (about 4 weeks). The calculated solvent content was 5.3%.

Example 8

Preparation of a Carboxymethyl Cellulose Acetate Butyrate (CMCAB) Dispersion of the Present Invention 100.6 grams of CMCAB 641-0.5 (Eastman Chemical Company) was combined with 376.3 grams of acetone (Aldrich, relative evaporation rate 6.3) and 25.5 grams of 3-methoxybutanol (Celanese, relative evaporation rate 0.08) in a 32 ounce jar which was allowed to roll overnight until a homogeneous solution was obtained. The above solution of CMCAB, acetone, and 3-methoxybutanol (502.4 grams) was charged to a three-neck, 2 liter round-bottom flask equipped with a nitrogen purge, thermocouple and a mechanical stirrer with a condenser, receiver, and dry ice trap configured for vacuum distillation. A heating mantle was placed under the round bottom flask. The solution in the flask was heated to 30° C. under mild agitation. A mixture of 1.94 grams of dimethylethanolamine (Aldrich—equivalent to 20% neutralization of the CMCAB, which has an acid number of 60) and 375.0 grams of distilled water was prepared and added dropwise to the solution in the round bottom flask over a period of 20 minutes. The temperature of the dispersion in the flask was raised to 40° C. and held for 45 minutes. A vacuum of approximately 230 mm Hg was applied to the dispersion and the temperature was very gradually ramped up to a final value of 45° C. over a period of about one hour where it was held for an additional hour. The solids content was determined to be about 21%, which was greater than the desired solids content of 20%. 28.0 grams of distilled water was added to the dispersion under mild agitation in order to achieve the target solids. The resulting product was analyzed for solids content (19.9%), pH (5.1), viscosity (411 cP), residual acetone content (by gas chromatography, about 0.3%), mean volume particle size (262 nm), and heat stability at 50° C. (about 4 weeks). The calculated solvent content was 5.3%.

Example 9

Preparation of a Carboxymethyl Cellulose Acetate Butyrate (CMCAB) Dispersion of the Present Invention 100.4 grams of CMCAB 641-0.5 (Eastman Chemical Company) was combined with 376.3 grams of acetone (Aldrich, relative evaporation rate 6.3)) and 25.5 grams of propylene glycol monopropyl ether (Dowanol® PnP, relative evaporation rate 0.2) in a 32 ounce jar which was allowed to roll overnight until a homogeneous solution was obtained. The above solution of CMCAB, acetone, and propylene glycol monopropyl ether (502.2 grams) was charged to a three-neck, 2 liter round-bottom flask equipped with a nitrogen purge, thermocouple and a mechanical stirrer with a condenser, receiver, and dry ice trap configured for vacuum distillation. A heating mantle was placed under the round bottom flask. The solution in the flask was heated to 30° C. under mild agitation. A mixture of 1.94 grams of dimethylethanolamine (Aldrich—equivalent to 20% neutralization of the CMCAB, which has an acid number of 60) and 375.0 grams of distilled water was prepared and added dropwise to the solution in the round bottom flask over a period of 20 minutes. The temperature of the dispersion in the flask was raised to 40° C. and held for 40 minutes. A vacuum of approximately 230 mm Hg was applied to the dispersion for approximately 1.6 hours. Solids consent was determined to be about 21%, which was greater than the desired solids content of 20%. 24.7 grams of distilled water was added to the dispersion under mild agitation in order to achieve the target solids. The resulting product was analyzed for solids content (19.8%), pH (5.4), viscosity (811 cP), residual acetone content (by gas chromatography, about 0.4%), mean volume particle size (243 nm), and heat stability at 50° C. (about 2 weeks). The calculated solvent content was 5.4%.

Example 10

Preparation of a Carboxymethyl Cellulose Acetate Butyrate (CMCAB) Dispersion of the Present Invention 100.8 grams of CMCAB 641-0.5 (Eastman Chemical Company) was combined with 376.3 grams of acetone (Aldrich, relative evaporation rate 6.3) and 25.5 grams of propylene glycol monobutyl ether (Lyondell PnB, relative evaporation rate 0.08) in a 32 ounce jar which was allowed to roll overnight until a homogeneous solution was obtained. The above solution of CMCAB, acetone, and propylene glycol monobutyl ether (502.6 grams) was charged to a three-neck, 2 liter round-bottom flask equipped with a nitrogen purge, thermocouple and a mechanical stirrer with a condenser, receiver, and dry ice trap configured for vacuum distillation. A heating mantle was placed under the round bottom flask. The solution in the flask was heated to 30° C. under mild agitation. A mixture of 1.94 grams of dimethylethanolamine (Aldrich—equivalent to 20% neutralization of the CMCAB, which has an acid number of 60) and 375.0 grams of distilled water was prepared and added dropwise to the solution in the round bottom flask over a period of 20 minutes. The temperature of the dispersion in the flask was raised to 40° C. and held for 25 minutes. A vacuum of approximately 225 mm Hg was applied to the dispersion for approximately 2 hours. The solids content was determined to be about 21%, which was greater than the desired solids content of 20%. 24.7 grams of distilled water was added to the dispersion under mild agitation in order to achieve the target solids. The resulting product was analyzed for solids content (19.9%), pH (5.2), viscosity (204 cP), residual acetone content (by gas chromatography, about 0.5%), mean volume particle size (180 nm), and heat stability at 50° C. (greater than 3 weeks). The calculated solvent content was 5.5%.

Example 11 (Comparative)

Preparation of a CMCAB Dispersion without the Less Volatile Coupling Solvent 100.4 grams of CMCAB 641-0.5 (Eastman Chemical Company) was combined with 400.0 grams of methyl ethyl ketone (Aldrich MEK, relative evaporation rate 3.8) in a 32 ounce jar which was allowed to roll overnight until a homogeneous solution was obtained. The above solution of CMCAB and MEK (500.4 grams) was charged to a three-neck, 2 liter round-bottom flask equipped with nitrogen purge, thermocouple, addition funnel, and a mechanical stirrer with a condenser, receiver, and dry ice trap configured for vacuum distillation. A heating mantle was placed under the round bottom flask. The solution in the flask was heated to 30° C. under mild agitation. A mixture of 1.94 grams of dimethylethanolamine (Aldrich—equivalent to 20% neutralization of the CMCAB, which has an acid number of 60) and 400.0 grams of distilled water was added dropwise to the solution in the round bottom flask under mild agitation over a period of 25 minutes. The temperature of the dispersion in the flask was raised to 40° C. and held for 40 minutes. A vacuum of about 235 mm Hg was applied to the dispersion, and the temperature was very gradually ramped up to a temperature of about 50° C. over the period of two hours. After approximately 10 minutes at about 50° C., the dispersion became unstable, and a gelatinous white mass was formed.

Example 12 (Comparative)

Preparation of a CMCAB Dispersion with a Less Volatile Non-Coupling Solvent 100.4 grams of CMCAB 641-0.5 (Eastman Chemical Company) was combined with 25.0 grams of 2,2,4-trimethylpentanediol 1,3-monoisobutyrate (Texanol® ester-alcohol—Eastman Chemical, relative evaporation rate 0.002) and 375.0 grams of methyl ethyl ketone (Aldrich MEK, relative evaporation rate 3.8) in a 32 ounce jar which was allowed to roll overnight until a homogeneous solution was obtained. The above solution of CMCAB and MEK (500.4 grams) was charged to a three-neck, 2 liter round-bottom flask equipped with nitrogen purge, thermocouple, addition funnel, and a mechanical stirrer with a condenser, receiver, and dry ice trap configured for vacuum distillation. A heating mantle was placed under the round bottom flask. The solution in the flask was heated to 30° C. under mild agitation. A mixture of 1.94 grams of dimethylethanolamine (Aldrich—equivalent to 20% neutralization of the CMCAB, which has an acid number of 60) and 375.0 grams of distilled water was added dropwise to the solution in the round bottom flask under mild agitation over a period of 20 minutes. The temperature of the dispersion in the flask was raised to 40° C. and held for 30 minutes. A vacuum of about 250 mm Hg was applied to the dispersion, and the temperature was very gradually ramped up to a temperature of about 43° C. over the period of 1.5 hours. The solids content was determined to be about 19.3%, which was less than the desired solids content of 20%. The vacuum was reapplied at about 250 mm Hg, and the temperature was increased to 45° C. in order to strip off the residual MEK. After approximately 30 minutes at about 45° C., the dispersion became unstable, and a gelatinous white mass was formed.

Example 13 (Comparative)

Preparation of a CMCAB Dispersion with a Blend of Two Less Volatile Non-Coupling Solvents 100.1 grams of CMCAB 641-0.5 (Eastman Chemical Company) was combined with 377.1 grams of methyl ethyl ketone (Aldrich MEK, relative evaporation rate 3.8), 14.1 grams of 2,2,4-trimethylpentanediol 1,3-monoisobutyrate (Texanol® ester-alcohol—Eastman Chemical Company, relative evaporation rate 0.002) and 12.0 grams of n-methylpyrrolidone (Aldrich, relative evaporation rate 0.06) in a 32 ounce jar which was allowed to roll overnight until a homogeneous solution was obtained. The blend ratio of the two non-coupling solvents was chosen to closely approximate the solubility parameter of ethylene glycol monobutyl ether. The above solution of CMCAB, MEK, 2,2,4-trimethylpentanediol 1,3-monoisobutyrate, and n-methylpyrrolidone (503.3 grams) was charged to a four neck 1 liter round bottom flask equipped with a nitrogen purge, addition funnel, thermocouple and a mechanical stirrer with a condenser, receiver, and dry ice trap configured for vacuum distillation. A heating mantle was placed under the round bottom flask. The solution in the flask was heated to 30° C. under mild agitation. 1.44 grams of 2-amino-2-methyl-1-propanol (Angus AMP-95®—equivalent to 15% neutralization of the CMCAB, which has an acid number of 60) was slowly added to the solution in the round bottom flask. The appearance of a viscous white skin was noted on the surface of the solution. 350.9 grams of distilled water was added dropwise to the solution in the round bottom flask over a period of about 30 minutes. The dispersion was held at 30° C. under mild agitation for about 1 hour. A vacuum of approximately 295 mm Hg was applied to the dispersion and the temperature was very gradually ramped up to a final value of 50° C. over a period of about 2 hours where it was held for an additional 45 minutes. The solids content was determined to be about 30.4%, which was greater than the desired solids content of 20%. 166.0 grams of distilled water was added to the dispersion under mild agitation in order to achieve the target solids. The resulting product was extremely viscous, but was still analyzed for solids content (19.5%), pH (5.5), viscosity (very high), residual MEK content (by gas chromatography, 0.02%), and mean volume particle size (788 nm). The heat stability at 50° C. could not be measured since the dispersion began settling out within a few days at room temperature. The calculated solvent content was 5.02%.

Example 14 (Comparative)

Preparation of a CMCAB Dispersion by a Conventional Dispersion Technique 60.0 grams of CMCAB 641-0.5 (Eastman Chemical) was combined with 60.0 grams of ethylene glycol monobutyl ether (Eastman EB, relative evaporation rate 0.09), 40.0 grams of isopropyl alcohol (Aldrich, relative evaporation rate 1.7) and 40.0 grams of methyl propyl ketone (Eastman MPK, relative evaporation rate 2.3) in a 16 ounce jar which was allowed to roll overnight until a homogeneous solution was obtained. The above solution of CMCAB, EB, isopropyl alcohol, and MPK (200.0 grams) was charged to a four neck 1 liter round bottom flask equipped with a mechanical stirrer and an addition funnel. A mixture of 1.14 grams of dimethylethanolamine (Aldrich—equivalent to 20% neutralization of the CMCAB, which has an acid number of 60) and 200.0 grams of distilled water was prepared and added dropwise to the solution in the round bottom flask under vigorous agitation over a period of about 10 minutes. The resulting dispersion was analyzed for viscosity (5000 cP), mean volume particle size (250 nm), and heat stability at 50° C. (greater than 4 weeks). The calculated percent solids was 15%. The calculated solvent content was 35%.

Example 15

Preparation of a Waterborne Automotive Basecoat from the CMCAB Dispersion of Example 10

The CMCAB dispersion from Example 10 was filtered through a Hayward filter bag (PE100PN164). Approximately 1.52 grams of dimethylethanolamine (Aldrich) was premixed with about 82 grams of distilled water. This amount of amine is sufficient to neutralize the remaining 80% of the acid groups that remain in 100.0 grams of CMCAB dispersion at 20% solids. The amine/water mixture from step 2 was slowly added to approximately 100 grams of the filtered CMCAB dispersion (from step 1) under moderate agitation to yield a 100% fully neutralized aqueous solution of CMCAB at approximately 11% solids. The viscosity of this aqueous solution was approximately 22,000 cP and the pH was 7.2. This aqueous CMCAB solution was incorporated into a waterborne automotive basecoat using the following formulation:

| | | |
|---|---|---|
| CMCAB aqueous solution (11% solids) - from above | Eastman Chemical | 48.3 grams |
| Duramac WR-7495 (70% solids in s-BuOH, EB) | Eastman Chemical | 3.4 grams |
| Reactol 100 (60% solids in MEK) | Eastman Chemical | 15.3 grams |

-continued

| | | |
|---|---|---|
| Cymel 350 | Cytec | 5.6 grams |
| SP303AR (37.5% solids in Aromatic 100) | Eckart | 17.0 grams |
| Byk-306 | Byk Chemie | 0.9 grams |
| n-Butanol | Aldrich | 9.4 grams |

All of the ingredients from the above formulation were mixed under moderate agitation and reduced in viscosity with 56.0 grams of distilled water (to approximately 18–20 seconds on a #4 Ford cup). 2-amino-2-methyl-1-propanol (Angus AMP-95®) was added the waterborne automotive basecoat formulation under gentle agitation until the pH reached 8.0. The waterborne automotive basecoats were then sprayed onto metal panels and subsequently allowed to flash for 10 minutes at 60° C. 2 coats of a DuPont Chroma Premier® 2K urethane clearcoat were subsequently applied and the panels were baked at 120° C. for 30 minutes. Flop measurements were made using an X-Rite® MA6811 Portable Multiple-Angle Spectrophotometer. An excellent average flop value of 17.4 was obtained on the sample before the clearcoat was applied, and a value of 14.6 was observed after the application of the clearcoat.

The invention has been described in detail with particular reference to preferred embodiments, but it will be understood that variations and modifications can be effected within the spirit and scope of the invention. Although specific terms are employed, they are used in a generic and descriptive sense only and not for purposes of limitation, the scope of the invention being set forth in the following claims.

We claim:

1. A process for producing an aqueous dispersion of a carboxylated cellulose ester, comprising:
   i) preparing a liquid mixture comprising:
      a) a carboxylated cellulose ester,
      b) a volatile hydrophilic organic solvent, having a relative evaporation rate of at least about 1.0, and a solubility in water of at least about 5 weight percent,
      c) a coupling solvent, having a relative evaporation rate of less than about 0.5, and a solubility in water of at least about 3 weight percent,
      d) a neutralizer, present in an amount sufficient to neutralize at least a portion of the carboxyl groups present on the carboxylated cellulose ester, and
      e) water; and
   ii) applying heat or vacuum, or both, in an amount sufficient to volatilize the volatile hydrophilic organic solvent, to obtain the aqueous dispersion of the carboxylated cellulose ester.

2. The process according to claim 1, wherein the amount of heat and optional vacuum applied does not substantially volatilize the neutralizer, the water, or the coupling solvent.

3. The process according to claim 1, wherein the heat is applied, and results in a temperature of the liquid mixture no greater than about 75° C.

4. The process according to claim 1, wherein the vacuum is applied in an amount from about 50 mm Hg to about 400 mm Hg.

5. The process according to claim 1, wherein the preparation of the liquid mixture includes a step of dissolving the cellulose ester in one or more of the volatile hydrophilic organic solvent or the coupling solvent.

6. The process according to claim 1, wherein the preparation of the liquid mixture includes a step of mixing the neutralizer with the water.

7. The process according to claim 1, wherein the liquid mixture is prepared by a process comprising:
   dissolving the carboxylated cellulose ester in one or more of the hydrophilic organic solvent or the coupling solvent;
   adding the neutralizer to the cellulose ester solution; and
   adding water to the resulting mixture.

8. The process according to claim 1, wherein the liquid mixture is prepared by a process comprising:
   dissolving the carboxylated cellulose ester in one or more of the hydrophilic organic solvent or the coupling solvent;
   adding any remaining amount of the hydrophilic organic solvent or the coupling solvent to obtain a cellulose ester solution;
   adding the neutralizer to the water; and
   adding a mixture of the neutralizer and the water to the cellulose ester solution.

9. The process according to claim 1, wherein the liquid mixture is prepared by a process comprising:
   adding the neutralizer to the water;
   dissolving the carboxylated cellulose ester in one or more of the hydrophilic organic solvent or the coupling solvent, and afterward adding any remaining amount of solvent, to obtain a cellulose ester solution; and
   adding the mixture of neutralizer, or a mixture of the neutralizer and water, to the cellulose ester solution.

10. The process according to claim 1, wherein the liquid mixture is prepared by a process comprising:
    dissolving the carboxylated cellulose ester in a blend of the hydrophilic organic solvent and the coupling solvent to obtain a cellulose ester solution;
    adding the neutralizer to the cellulose ester solution to obtain a salt solution of the cellulose ester; and
    adding the water to the salt solution to obtain the liquid mixture.

11. The process according to claim 1, wherein the preparation of the liquid mixture includes a step of adding the neutralizer to one or more of the hydrophilic organic solvent or the coupling solvent.

12. The process according to claim 1, wherein the preparation of the liquid mixture includes a step of adding the carboxylated cellulose ester to a mixture of the neutralizer and the water.

13. The process according to claim 1, wherein the preparation of the liquid mixture includes a step of adding the carboxylated cellulose ester to the neutralizer.

14. The process according to claim 1, wherein the carboxylated cellulose ester is soluble in the hydrophilic organic solvent at a concentration of at least about 25 percent by weight.

15. The process according to claim 1, wherein the carboxylated cellulose ester is soluble in the hydrophilic organic solvent at a concentration of at least about 40 percent by weight.

16. The process according to claim 1, wherein the hydrophilic organic solvent comprises one or more of methanol, ethanol, propanol, isopropanol, acetone, methyl ethyl ketone, methyl propyl ketone, tetrahydrofuran, or dioxane.

17. The process according to claim 1, wherein the hydrophilic organic solvent has a relative evaporation rate of at least 2.

18. The process according to claim 1, wherein the hydrophilic organic solvent has a relative evaporation rate from about 2 to about 10.

19. The process according to claim 1, wherein the hydrophilic organic solvent has a solubility in water of at least 10 weight percent.

20. The process according to claim 1, wherein the hydrophilic organic solvent is a ketone.

21. The process according to claim 1, wherein the hydrophilic organic solvent comprises one or more of methyl ethyl ketone or acetone.

22. The process according to claim 1, wherein the hydrophilic organic solvent is present in the liquid mixture in an amount from about 1 part per part of carboxylated cellulose ester to about 5 parts per part of carboxylated cellulose ester.

23. The process according to claim 1, wherein the carboxylated cellulose ester is soluble in the coupling solvent at a concentration of at least about 25 percent by weight.

24. The process according to claim 1, wherein the carboxylated cellulose ester is soluble in the coupling solvent at a concentration of at least about 40 percent by weight.

25. The process according to claim 1, wherein the coupling solvent has a relative evaporation rate less than about 0.2.

26. The process according to claim 1, wherein the coupling solvent has a relative evaporation rate from about 0.001 to about 0.5.

27. The process according to claim 1, wherein the coupling solvent has a solubility in water of at least 5 weight percent.

28. The process according to claim 1, wherein the coupling solvent comprises one or more of: ethylene glycol monopropyl ether, ethylene glycol monobutyl ether, 3-methoxybutanol, propylene glycol monopropyl ether, propylene glycol monobutyl ether, diethylene glycol monoethyl ether, diethylene glycol monopropyl ether, diethylene glycol monobutyl ether, dipropylene glycol monopropyl ether, or dipropylene glycol monobutyl ether.

29. The process according to claim 1, wherein the coupling solvent is present in the liquid mixture in an amount from about 0.1 parts per part of carboxylated cellulose ester to about 0.5 parts per part of carboxylated cellulose ester.

30. The process according to claim 1, wherein the neutralizer comprises one or more of ammonia or an amine.

31. The process according to claim 1, wherein the neutralizer comprises one or more of: dimethylethanolamine, triethanolamine, 2-amino-2-methyl-1-propanol, ammonia, piperidine, 4-ethylmorpholine, diethanolamine, ethanolamine, tributylamine, dibutylamine, potassium hydroxide, or sodium hydroxide.

32. The process according to claim 1, wherein the neutralizer is provided in an amount sufficient to neutralize from about 5% to about 50% of the carboxyl moieties on the carboxylated cellulose esters.

33. The process according to claim 1, wherein the neutralizer is provided in an amount sufficient to neutralize from about 10% to about 30% of the carboxyl moieties on the carboxylated cellulose esters.

34. The process according to claim 1, wherein the carboxylated cellulose ester has an acid value from about 10 to about 150.

35. The process according to claim 1, wherein the carboxylated cellulose ester has an acid value from about 20 to about 120.

36. The process according to claim 1, wherein the carboxylated cellulose ester has a degree of ester substitution per anhydroglucose unit from about 1.0 to about 3.0.

37. The process according to claim 1, wherein the carboxylated cellulose ester has a degree of ester substitution per anhydroglucose unit from about 1.3 to about 2.8.

38. The process according to claim 1, wherein the carboxylated cellulose ester is a carboxyalkyl cellulose ester.

39. The process according to claim 1, wherein the carboxylated cellulose ester is a carboxymethyl cellulose ester.

40. The process according to claim 1, wherein the carboxylated cellulose ester has a number average molecular weight from about 1000 to about 50,000.

41. The process according to claim 1, wherein the carboxylated cellulose ester has a number average molecular weight from about 2,000 to about 40,000.

42. The process according to claim 1, wherein the carboxylated cellulose ester is a carboxyalkyl cellulose ester having an inherent viscosity, as measured in a 60/40 (wt./wt.) solution of phenol/tetrachloroethane at 25° C., from about 0.05 to about 2.0.

43. The process according to claim 1, wherein the carboxylated cellulose ester comprises a carboxymethyl cellulose acetate butyrate.

44. The process according to claim 1, wherein the carboxylated cellulose ester comprises a carboxymethyl cellulose acetate propionate.

45. The process according to claim 1, wherein the carboxylated cellulose ester comprises one or more of: a carboxymethyl cellulose acetate, a carboxymethyl cellulose butyrate, or a carboxymethyl cellulose propionate.

46. The process according to claim 1, wherein the carboxylated cellulose ester is prepared by reacting a cellulose ester with ozone.

47. The process according to claim 46, wherein the cellulose ester comprises one or more of: cellulose acetate, cellulose propionate, cellulose butyrate, cellulose acetate butyrate, or cellulose acetate propionate.

48. The process according to claim 1, wherein the carboxylated cellulose ester is prepared by reacting cellulose with a dicarboxylic acid.

49. The process according to claim 1, wherein the resulting aqueous dispersion comprises at least 50 percent by weight water.

50. The process according to claim 1, wherein the resulting aqueous dispersion contains no more than 10% by weight organic solvent content.

51. The process according to claim 1, wherein the resulting aqueous dispersion contains no more than 6% by weight organic solvent content.

52. The process according to claim 1, wherein the resulting aqueous dispersion contains no more than about 5% by weight organic solvent content.

53. The process according to claim 1, wherein the resulting aqueous dispersion contains from about 3% to about 10% by weight organic solvent content.

54. The process according to claim 1, wherein the resulting aqueous dispersion contains substantially no surfactant.

55. The process according to claim 1, wherein the resulting aqueous dispersion has a pH of no more than about 7.

56. The process according to claim 1, wherein the resulting aqueous dispersion has a pH from about 3 to about 7.

57. The process according to claim 1, wherein the resulting aqueous dispersion has a mean volume particle size less than about 400 nm.

58. The process according to claim 1, wherein the resulting aqueous dispersion has a mean volume particle from about 50 nm to about 500 nm.

59. The process according to claim 1, wherein the resulting aqueous dispersion has a solids content from about 5% to about 40% by weight.

60. The process according to claim 1, wherein the resulting aqueous dispersion has a solids content from about 10% to about 30% by weight.

61. The process according to claim 1, wherein the resulting aqueous dispersion has an organic solvent content in an amount from about 0.1 parts per part of carboxylated cellulose ester to about 0.5 parts per part of carboxylated cellulose ester.

62. The process according to claim 1, wherein the resulting aqueous dispersion has an organic solvent content in an amount from about 0.15 parts per part of carboxylated cellulose ester to about 0.35 parts per part of carboxylated cellulose ester.

63. An aqueous dispersion of a carboxylated cellulose ester, made by a process comprising:
  i) preparing a liquid mixture comprising:
   a) a carboxylated cellulose ester,
   b) a volatile hydrophilic organic solvent, having a relative evaporation rate of at least 1.0, and a solubility in water of at least about 5 weight percent,
   c) a coupling solvent, having a relative evaporation rate of less than about 0.5, and a solubility in water of at least about 3 weight percent,
   d) a neutralizer, present in an amount sufficient to neutralize at least a portion of the carboxyl groups present on the carboxylated cellulose ester, and
   e) water; and
  ii) applying at least one of heat or vacuum, in an amount sufficient to volatilize the volatile hydrophilic organic solvent, to obtain the aqueous dispersion of the carboxylated cellulose ester.

64. An aqueous coating composition, comprising the aqueous dispersion of claim 63.

65. The aqueous coating composition of claim 64, wherein the composition further comprises one or more of: leveling, rheology, and flow control agents; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

66. The aqueous coating composition of claim 64, further comprising one or more fillers and/or pigments.

67. The coating composition of claim 66, wherein the pigment is comprised of aluminum or mica.

68. A shaped or formed article coated with the composition of claim 64.

69. A pigment dispersion comprising the aqueous dispersion of claim 63, and about 20 to 50 weight percent by weight of a pigment.

* * * * *